US009150181B2

(12) United States Patent
Schroeder et al.

(10) Patent No.: US 9,150,181 B2
(45) Date of Patent: Oct. 6, 2015

(54) NET STRUCTURE FOR A VEHICLE

(71) Applicant: Honda Motor Co., Ltd., Tokyo (JP)

(72) Inventors: Anthony Schroeder, Huntington Beach, CA (US); Jacob O. Borth, Columbus, OH (US); Takeshi Kobayashi, Tochigi (JP); Tsuyoshi Kumasaka, Dublin, OH (US); Stephen L. Paulos, Powell, OH (US); Nithya Rajan, Dublin, OH (US); Matthew L. Taracko, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 14/138,168

(22) Filed: Dec. 23, 2013

(65) Prior Publication Data

US 2015/0175114 A1    Jun. 25, 2015

(51) Int. Cl.
| | |
|---|---|
| *B60R 21/06* | (2006.01) |
| *B60J 5/04* | (2006.01) |
| *B60R 21/13* | (2006.01) |
| *B60R 21/02* | (2006.01) |

(52) U.S. Cl.
CPC ............... *B60R 21/06* (2013.01); *B60J 5/0487* (2013.01); *B60R 21/026* (2013.01); *B60R 21/13* (2013.01); *B60R 2021/028* (2013.01); *B60Y 2200/124* (2013.01)

(58) Field of Classification Search
CPC ........ B60J 5/0487; B60R 21/06; B60R 21/13; B60R 2021/028; E06B 9/00; E06B 9/02; B60Y 2200/124
USPC .......................................................... 280/749
See application file for complete search history.

(56) References Cited

U.S. PATENT DOCUMENTS

| | | | |
|---|---|---|---|
| 1,428,708 A | 9/1922 | Rahr, Jr. | |
| 1,428,709 A | 9/1922 | Rahr, Jr. | |
| 5,290,086 A | 3/1994 | Tucker | |
| 6,135,497 A | 10/2000 | Sutherland et al. | |
| 6,773,054 B2 | 8/2004 | Martini | |
| 6,890,036 B2 | 5/2005 | Wiener et al. | |
| 7,125,069 B2 | 10/2006 | Cacucci et al. | |
| 7,150,246 B1 | 12/2006 | Weimer | |
| 7,464,962 B2 | 12/2008 | Hakansson et al. | |
| 7,556,291 B2 | 7/2009 | Gale et al. | |
| 7,618,081 B2 | 11/2009 | Rankin et al. | |
| 7,819,458 B2 | 10/2010 | Raynor | |
| 7,832,788 B2 | 11/2010 | Marsh et al. | |
| 8,123,279 B2 * | 2/2012 | Orr et al. | 296/148 |
| 8,292,352 B2 * | 10/2012 | Furman et al. | 296/190.03 |
| 8,308,223 B2 * | 11/2012 | King | 296/190.03 |
| 8,328,235 B2 * | 12/2012 | Schneider et al. | 280/748 |
| 8,464,824 B1 * | 6/2013 | Reisenberger | 180/268 |
| 8,465,050 B1 * | 6/2013 | Spindler et al. | 280/749 |

(Continued)

*Primary Examiner* — Paul N Dickson
*Assistant Examiner* — Timothy Wilhelm
(74) *Attorney, Agent, or Firm* — Rankin, Hill & Clark LLP

(57) ABSTRACT

A net structure for a vehicle includes a first connection to a door arranged in a side opening of the vehicle for selectively closing a door opening portion of the side opening, a second connection to a roll cage frame at or adjacent an upper portion of a passenger seating compartment and a third connection to a vehicle frame of the vehicle. The roll cage frame at least partially defines the side opening. The net structure further includes a tautness axis defined between the second connection and the third connection that is substantially forward of a head area of the passenger compartment with tautness maintained along the tautness axis.

20 Claims, 9 Drawing Sheets

(56) References Cited

U.S. PATENT DOCUMENTS

| | | |
|---|---|---|
| 8,479,854 B1 * | 7/2013 | Gagnon .................. 180/68.3 |
| 8,696,006 B2 * | 4/2014 | Sanschagrin et al. ........ 280/256 |
| 8,714,591 B1 * | 5/2014 | Kobayashi et al. .......... 280/749 |
| 2001/0033084 A1 | 10/2001 | Murray et al. |
| 2009/0243339 A1 * | 10/2009 | Orr et al. ................. 296/190.03 |
| 2011/0241325 A1 * | 10/2011 | King et al. .................... 280/756 |
| 2013/0087394 A1 | 4/2013 | Sanschagrin et al. |

* cited by examiner

NET STRUCTURE FOR A VEHICLE

BACKGROUND

Side-by-side all-terrain vehicles (ATVs) generally have an open cockpit area with side-by-side seating. The open cockpit area is often protected by a roll cage disposed above the cockpit area. The driver and the passenger enter and exit (ingress and egress) the vehicle through lateral side openings. Current side-by-side regulations require the use of safety devices to contain the occupants of the vehicle in the event of a vehicle roll-over. Doors and/or nets have conventionally been used to satisfy these safety requirements. Many current designs involve multiple, time consuming processes and/or require the use of two hands to open the door and/or net provided over the side opening. Additionally, some designs can inhibit easily entering and exiting the vehicle during normal operation. Further, some operators ignore or remove the safety features from the vehicle due to the inconvenience of operation.

SUMMARY

According to one aspect, a vehicle includes a vehicle frame, a passenger seating compartment having a head area arranged to be occupied by an occupant's head when seated in the passenger compartment, a side opening for providing ingress and egress with the passenger seating compartment, a roll cage frame at least partially defining the side opening and a door arranged in the side opening for selectively closing a door opening portion of the side opening. The vehicle further includes a net structure having a first connection to the door, a second connection to the roll cage frame at or adjacent an upper portion of the passenger seating compartment and a third connection to the vehicle frame. A tautness axis is defined between the second connection and the third connection that is substantially forward of the head area. The net structure is taut along the tautness axis.

According to another aspect, a net structure for a vehicle includes a first connection to a door arranged in a side opening of the vehicle for selectively closing a door opening portion of the side opening, a second connection to a roll cage frame at or adjacent an upper portion of a passenger seating compartment and a third connection to a vehicle frame of the vehicle. The roll cage frame at least partially defines the side opening. The net structure further includes a tautness axis defined between the second connection and the third connection that is substantially forward of a head area of the passenger compartment with tautness maintained along the tautness axis.

According to a further aspect, a door and net structure combination includes a first connection of the net structure disposed on the door, wherein the door is arranged in a side opening of a vehicle for selectively closing at least a portion of the side opening, a second connection of the net structure disposed on a roll cage portion that at least partially defines the side opening, and a third connection disposed on a vehicle frame to which the door is pivotally mounted. The door and net structure combination further includes a tautness axis defined along the second and third connection wherealong tautness of the net structure is maintained.

DETAILED DESCRIPTION

Figure 1:
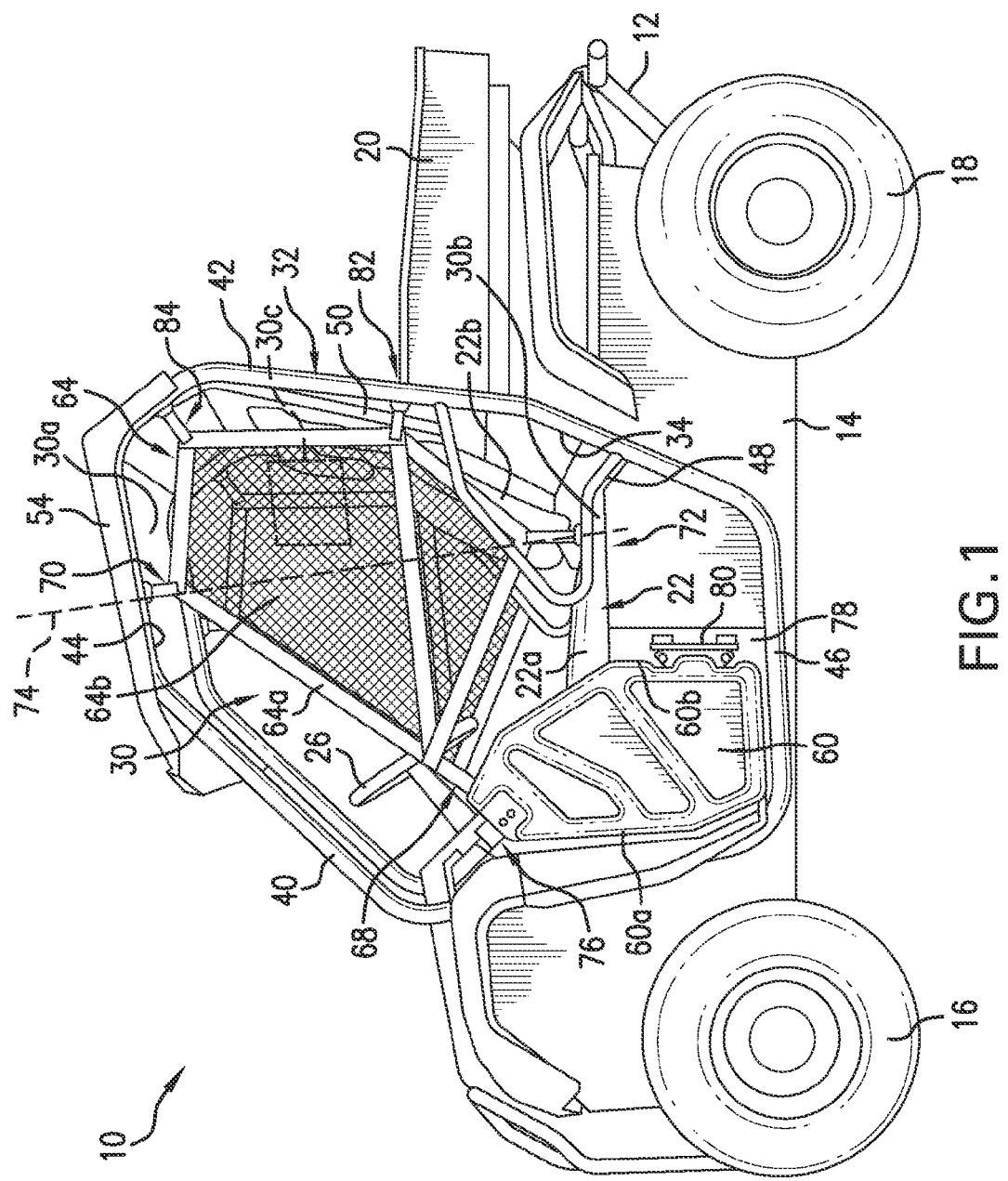
FIG. 1 is a left-side elevation view of a vehicle having a net structure on each side of the vehicle according to an exemplary embodiment.
Figure 2:
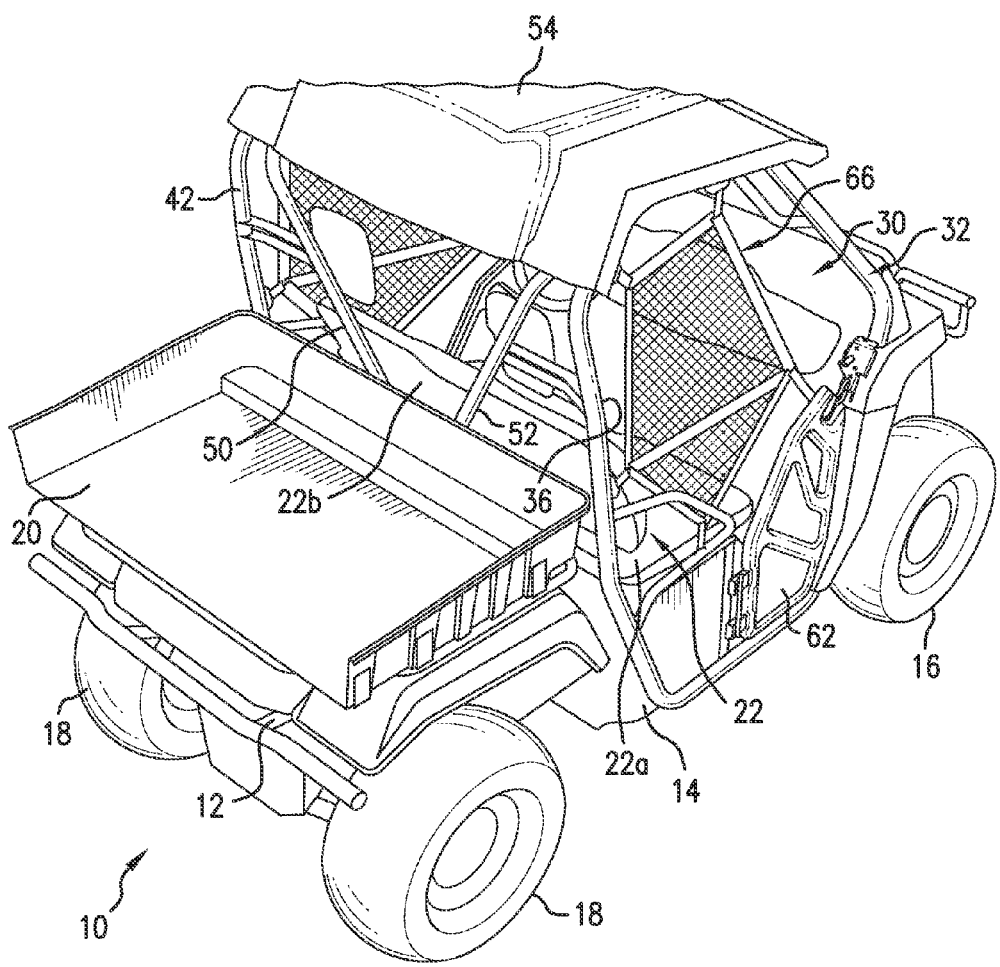
FIG. 2 is a rear perspective view of the vehicle of FIG. 1 showing a right-side of the vehicle.

Referring now to the drawings wherein the showings are for purposes of illustrating one or more exemplary embodiments and not for purposes of limiting the same, FIGS. 1 and 2 show a vehicle according to an exemplary embodiment generally designated by reference numeral 10. The vehicle 10 can include a vehicle frame 12 and a body 14 supported by the frame 12. The vehicle 10 can further include a pair of front wheels 16 and a pair of rear wheels 18. The wheels 16, 18 can be suspended from the frame 12 and can be rotatable relative to the frame 12 as is known and understood by those skilled in the art. The vehicle 10 can also include a source of motive power (not shown), which can be an internal combustion engine and/or one or more electric motors, and a drive train (also not shown) for transferring torque from the source of motive power to one or more of the front wheels 16 and/or the rear wheels 18.

In the illustrated embodiment, the vehicle 10 is shown as a utility-type vehicle, and particularly as a side-by-side all-terrain vehicle (ATV). The vehicle 10 of the illustrated embodiment includes a utility bed 20 that can be fixed with respect to the body 14, or that can be selectively pivotable as a dump-type bed. The utility bed 20 can be configured to support cargo and/or passengers for transportation by the vehicle 10. The vehicle 10 can further include a seat 22 that can be supported by the frame 12 and/or the body 14, and that can be configured to support an occupant (e.g., occupant OC shown in FIG. 4). In the illustrated embodiment, the seat 22 is a bench-type seat including a seat base 22a substantially spanning a lateral width of the vehicle 10 and a seat back 22b also substantially spanning the lateral width of the vehicle 10 and extending upward from the seat base 22a. As shown, the seat 22 can accommodate at least two vehicle occupants in a side-by-side seating arrangement. Alternatively, though not shown, the seat 22 can be configured as a pair of bucket-type seats. A steering wheel 26 operatively coupled to the front wheels 16 can be provided on the vehicle 10. In the illustrated embodiment, the steering wheel 26 is arranged on a left-side of the vehicle 10 (i.e., the side illustrated in FIG. 1), though other positioning locations for the steering wheel 26 could be employed (e.g., right-side or centrally located).

To encompass the seat 22, the vehicle 10 can additionally include a passenger seating compartment 30 defined at least partially by the body 14 and a roll cage frame 32, which can be attached to, and supported by, the frame 12 and/or the body 14 of the vehicle 10. The roll cage frame 32 can at least partially define the passenger seating compartment 30, which can also be referred to as a protected area. The seat 22 can be positioned within the passenger seating compartment 30, such that an operator or other occupant of the vehicle 10 is located within the passenger seating compartment 30 when seated upon the seat 22 (e.g., such as during operation of the vehicle 10 in the case of an operator/occupant).

Side openings 34, 36 for providing ingress and egress with the passenger seating compartment 30 can be provided with the roll cage frame 32 at least partially defining the side openings 34, 36. More particularly, in the illustrated embodiment, the vehicle 10 includes a left-side side opening 34 (the side opening shown in FIG. 1) and a right-side side opening 36 (the side opening shown in FIG. 2). The roll cage frame 32 can at least partially define the left-side side opening 34 on the left side of the vehicle 10 and can at least partially define the right-side side opening 36 on the right side of the vehicle 10.

As shown in FIG. 1, on the left-side of the vehicle, the roll cage frame 32 can include a forward tubular member 40, a rearward tubular member 42, an upper tubular member 44, and a lower tubular member 46. The roll cage frame member 32 can further include a lower member 48 attached to the rearward tubular member 42 and projecting forwardly therefrom adjacent a left lateral side of the seat 22. The tubular members 40, 42, 44, 46 can be attached to the frame 12 and/or the body 14 of the vehicle 10. Likewise, the lower member 48 is attached to the frame 12 and/or the body 14 via the tubular member 42. As shown in the illustrated embodiment, the tubular members 40, 42, 44, 46, 48 can be integral with one another, though this is not required. With reference to FIG. 2, the roll cage frame 32 can include a similar arrangement of tubular members on the right-side of the vehicle 10. As is known and understood by those skilled in the art, crossing or reinforcing members, such as illustrated tubular members 50, can span the lateral width of the vehicle 10 to connect the left-side tubular members 40-46 to the right-side tubular members on the vehicle 10. A roof 50 can be secured to the roll cage frame 32, and particularly carried by the upper tubular members (e.g., upper tubular member 44) at each side of the vehicle 10. Of course, the roll cage 32 can be configured other than is depicted in the illustrated embodiment.

A door 60 can be arranged in the side opening 34 for selectively closing a door opening portion of the side opening 34 (i.e., the door opening portion being the area of the side opening 34 that is occupied by the door 60 when in a closed position). Likewise, a door 62 is arranged in the right-side side opening 36 for selectively closing a door opening portion of the side opening 36. The vehicle 10 can further include a net structure 64 arranged in the side opening 34 and a net structure 66 arranged in the side opening 36. The net structures 64 and 66 can be generally the same, but mirrored relative to one another for fitting within the respective side openings 34, 36. Accordingly, only the net structure 64 will be described in further detail, but details concerning the net structure 64 are applicable to the net structure 66 as will be understood and appreciated by those skilled in the art.

Figure 3:
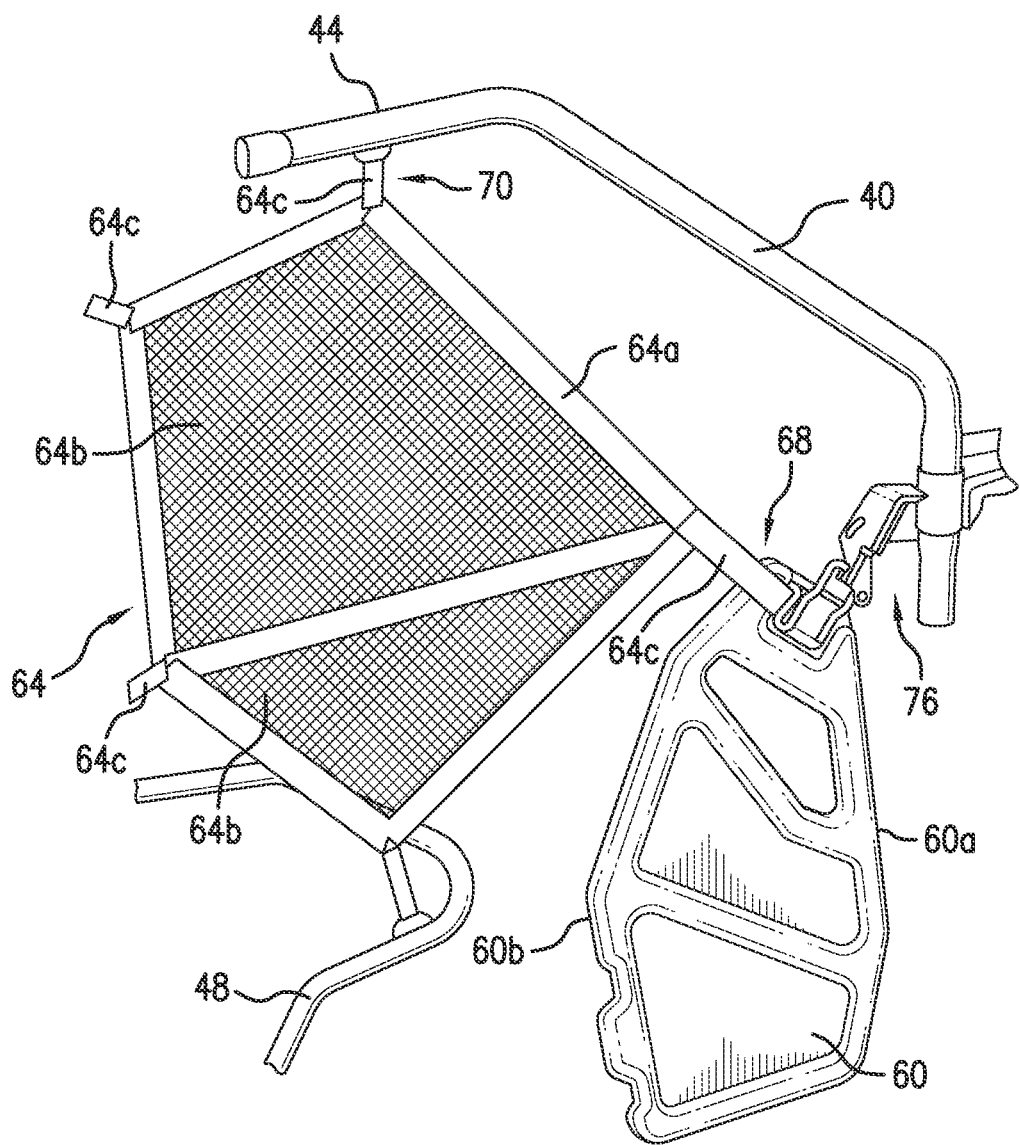
FIG. 3 is an inside perspective view showing, in isolation, the left-side net structure, a left-side door to which the net structure is attached, a left-side lower member to which the net structure is attached and a portion of a left-side roll cage frame to which the net structure is attached.
Figure 4:
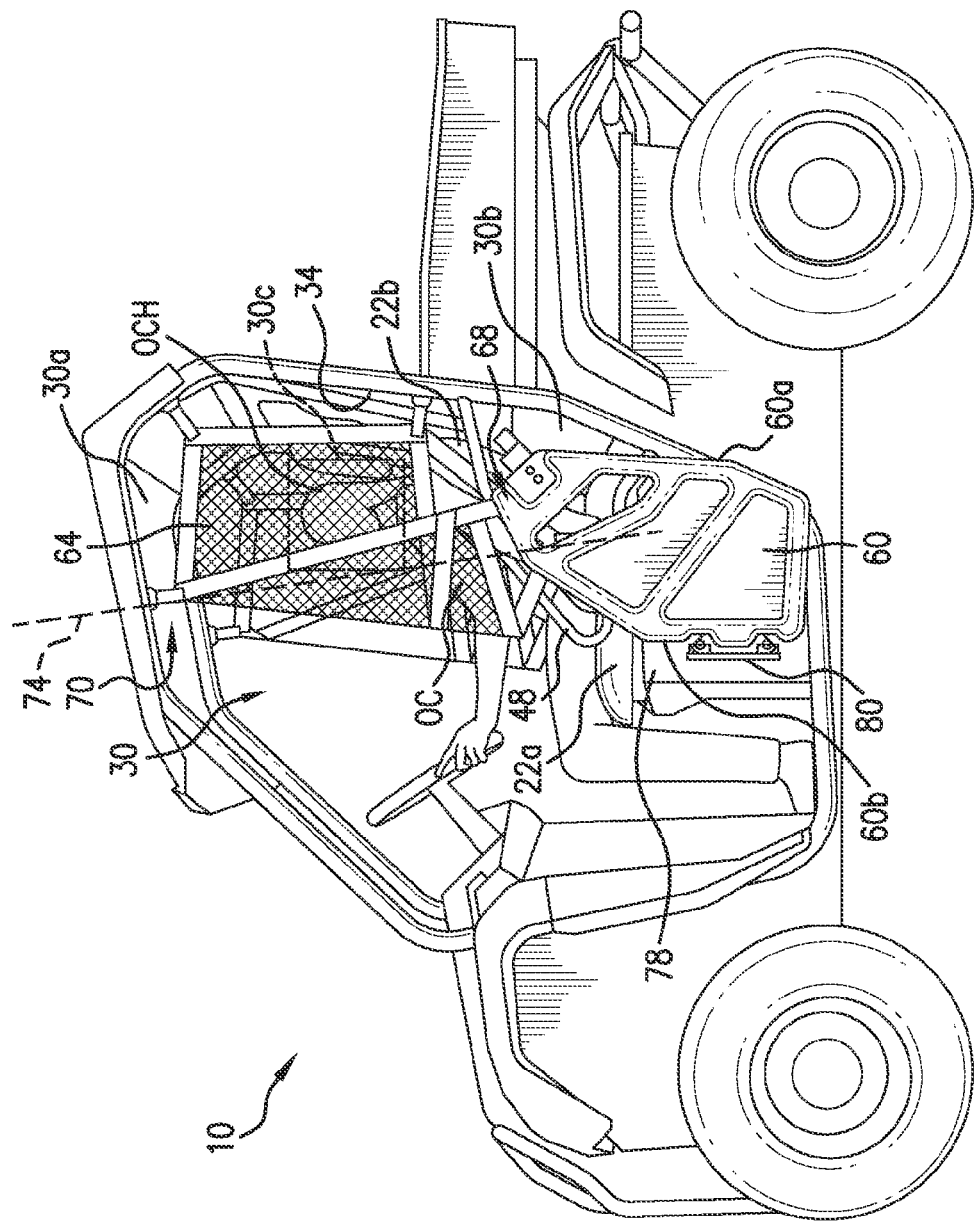
FIG. 4 is a side elevation view similar to FIG. 1 but showing side doors of the vehicle in open positions to fold back respective net structures.

With additional reference to FIGS. 3 and 4, the net structure 64 has a first connection 68 to the door 60, a second connection 70 to the roll cage frame 32 at or adjacent in upper portion 30a of the passenger seating compartment 30 and a third connection 72 to the lower member 48 of the roll cage frame 32 at or adjacent a lower portion 30b of the passenger seating compartment 30. The passenger seating compartment 30 has or defines a head area 30c (shown in dashed lines in FIGS. 1 and 4) arranged to be occupied by an occupant's head OCH when the occupant OC is seated in the passenger compartment 30 on the seat 22 (see FIG. 4). More particularly, the head area 30c is a profile or cross-section area of the passenger compartment 30 that is associated with the seat 22. Accordingly, when the occupant OC is seated in the seat 22 in a normal seating position (i.e., as shown schematically in FIG. 4), the head OCH of the occupant OC will reside in the head area 30c of the passenger compartment 30.

More particularly, the head area 30c is defined above the seat base 22a and generally forward of the seat back 22b, particularly at the upper-most portion of the seat back 22b. A tautness axis 74 is defined between the second connection 70 and the third connection 72 and this tautness axis 74 is disposed forward of the head area 30c. In particular, the tautness axis 74 is spaced apart forwardly relative to a direction of travel of the vehicle 10 as compared to the head area 30c. The net structure 64 is taut along the tautness axis 74 (i.e., tautness is maintained along the tautness axis 74) and such tautness is maintained irrespective of a position, open or closed, of the door 60. More particularly, the net structure 64 is taut along the tautness axis 74 regardless of the position, open or closed, of the vehicle door 60 to which the net structure 64 is connected via the first connection 68.

More specifically, the door 60 has a forward edge 60a and a rearward edge 60b. The rearward edge 60b is pivotally connected to the vehicle frame and/or body 14 such that the forward edge 60a is openable to open the door opening portion of the side opening 34. In particular, the vehicle frame 12 and/or body 14 can include a panel 78 arranged in the side opening 34 rearward of the door opening portion with a hinge 80 pivotally connecting the rearward edge 60b of the door 60 to the panel 78 and thereby to the vehicle frame 12 and/or body 14. As shown, the first connection 68 is disposed forward (relative to the vehicle 10 and/or a direction of travel for the vehicle 10) of the rearward edge 60b of the door. The door 60 is latchable to the vehicle frame 12 and/or body 14 at or adjacent the forward edge 60a of the door. More particularly, and with additional reference to FIG. 5A, a latching assembly 76 selectively latches the door 60 at or adjacent the forward edge 60a. Advantageously, the latching assembly 76 allows the forward edge 60a of the door 60 to be unlatched via one hand operation by an occupant entering or exiting the vehicle.

As shown in the illustrated embodiment, the net structure 64 can have a fourth connection 82 to the roll cage frame 32 at a location rearward of the second and third connections 70, 72. In the illustrated embodiment, the fourth connection 82 is to the rearward tubular member 42 of the roll cage frame 32 at a location vertically spaced apart from and between the second and third connections 70, 72. As such, the fourth connection 82 can be at or adjacent a rear portion of the passenger seating compartment 30. In the illustrated embodiment, the fourth connection 82 is also located at an approximate vertical center of the passenger seating compartment 30. Further, the net structure 64 can have a fifth connection 84 to the roll cage frame 32. In the illustrated embodiment, the fifth connection 84 is at a location rearward of the second and third connections 70, 72 and at or adjacent the upper portion 30a of the passenger seating compartment 30. More particularly, in the illustrated embodiment, the fifth connection 84 can be at or adjacent an intersection between the rearward tubular member 42 and the upper tubular member 44.

The net structure 64 of the illustrated embodiment includes webbing 64a and a mesh portion or portions 64b. As shown in the illustrated embodiment, the webbing 64a can be provided about an entire periphery of the net structure 64 so that the webbing extends to each of the first, second and third connections 68, 70 and 72. Thus, the webbing 60a interconnects to each of the first, second and third connections 72. The webbing 64a can also extend to the fourth and fifth connections 82, 84 in the same manner as to the first, second and third connection 68, 70 and 72. Thus, in the illustrated embodiment, the webbing additionally interconnects to each of the fourth and fifth connections 82, 84. Additionally, in the illustrated embodiment, the webbing 64a also extends between the first connection 68 and the fourth connection 82. Further, and also as shown, the webbing 64a can includes tab portions 64c at each of the connections 68, 70, 72, 82 and 84. The mesh 64b is arranged within openings defined by the webbing 64a. Each of the webbing 64a and the mesh portions 64b can be formed of any suitable material for a net structure on a vehicle as will be known and understood by those skilled in the art.

Figure 5A:
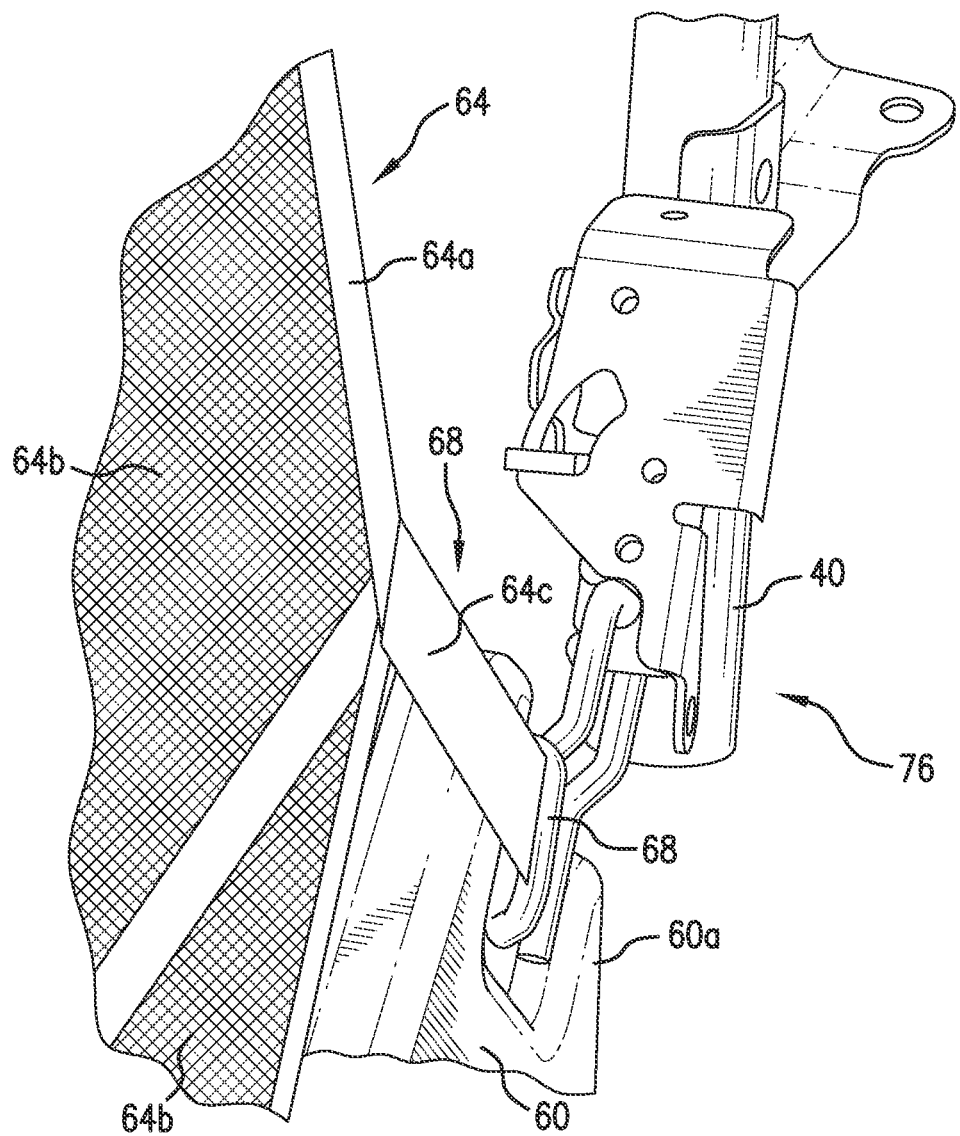
FIG. 5A is a partial enlarged perspective view showing a latching connection between the left-side door and the left side roll cage frame, and showing a connection between the left-side net structure and the left-side door.

With specific reference to FIG. 5A, the first connection 68 is located at or adjacent the forward edge 60a of the door 60. In the illustrated embodiment, the tab portion 64c at the first connection 68 is connected to a raised element 86 fixedly secured to the door 60. The raised element 86 can be a portion of a striker to which the latch 76 releasably connects, though this is not required. As will be known and understood by those skilled in the art, the tab portion 64c can be connected to the raised element 86 via looping therearound and/or clipping to the raised element 86 and any suitable connection could be used. More generally, the net structure 64 can be connected to the door 60 via any suitable connection type and need not be limited to what is shown and described herein.

Figure 5B:
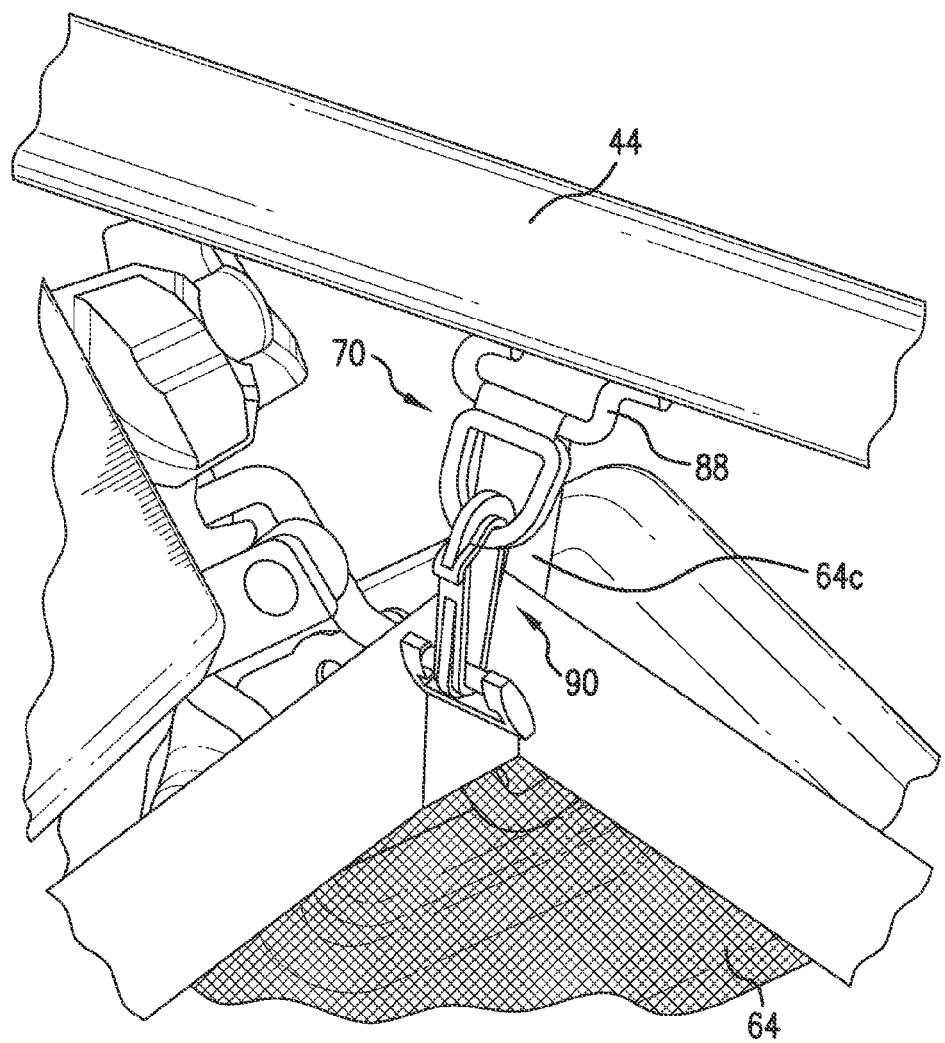
FIG. 5B is a partial enlarged perspective view showing a connection between the left-side net structure and the left-side roll cage frame.
Figure 5C:
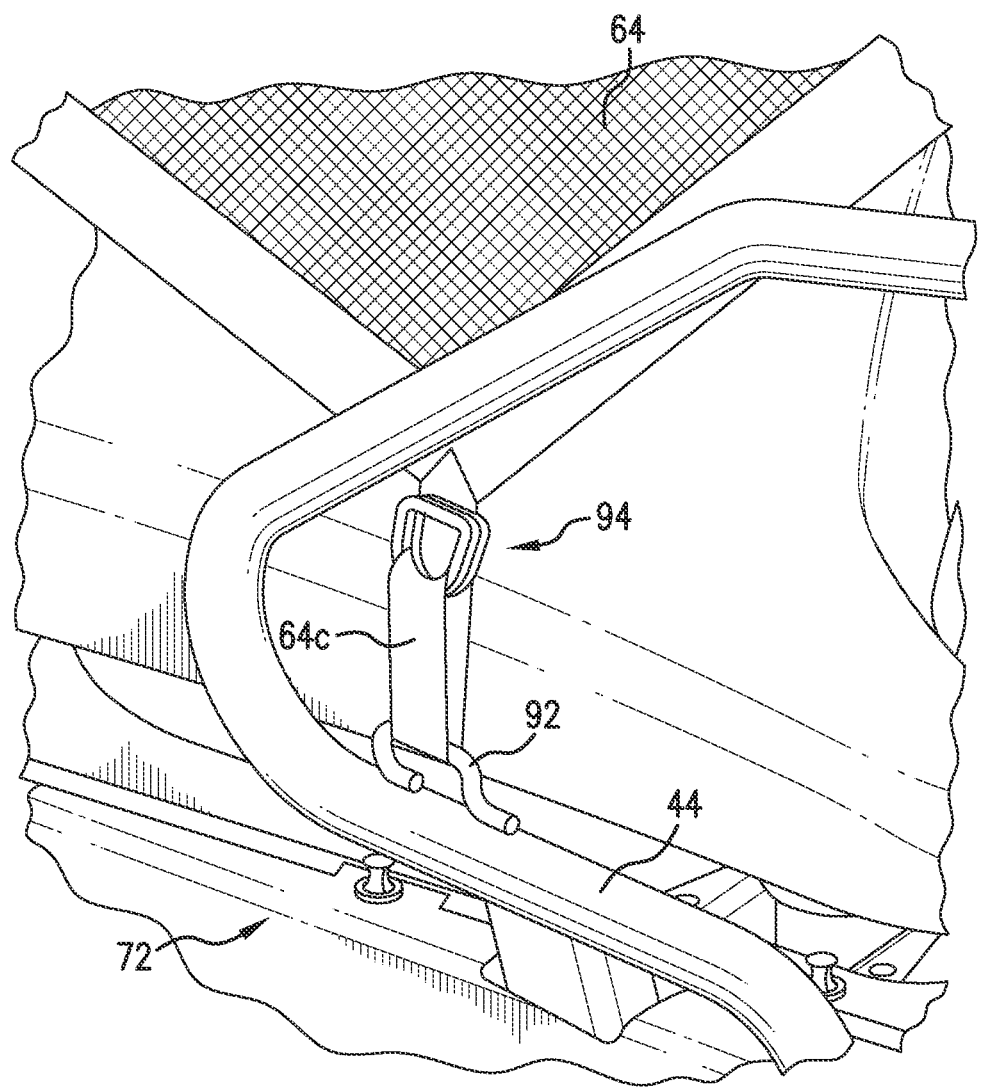
FIG. 5C is a partial enlarged perspective view showing a connection between the left-side net structure and the lower member.

With specific reference to FIG. 5B, the second connection 70 connects an upper end of the net structure 64 to the upper tubular member 44 of the roll cage frame 32. As shown, the tab portion 64c at the second connection 70 can be looped around a raised element 88 fixedly secured (e.g., via welding) to the upper tubular member 44 and can include a suitable fastener 90 allowing for a removable connection between the net structure 64 and the upper tubular member 44 (e.g., the fastener 90 can be a clip fastener removably connected to a D-ring, as shown in the illustrated embodiment). Similarly, with specific reference to FIG. 5C, the third connection 72 connects a lower end of the net structure 64 to the lower member 44, which is itself fixedly secured to the rearward tubular member 42 (not shown in FIG. 5C). As shown, the tab portion 64c at the third connection 72 can be looped around a raised element 92 fixedly secured (e.g., via welding) to the lower member 48 and can include a suitable fastener 94. Similar connection types can be used for the fourth and fifth connections 82, 84.

It is to be understood and appreciated by those skilled in the art that other connection types for the connections 68, 70, 72, 82, 84 can be used for the net structure 64 and the connection types need not be limited to those shown and described herein. Also, while the illustrated embodiment is shown with five connections between the net structure 64 and the vehicle 10, it is to be appreciated and understood by those skilled in the art that less than five connections could be provided or more than five connections could be provided.

Figure 6:
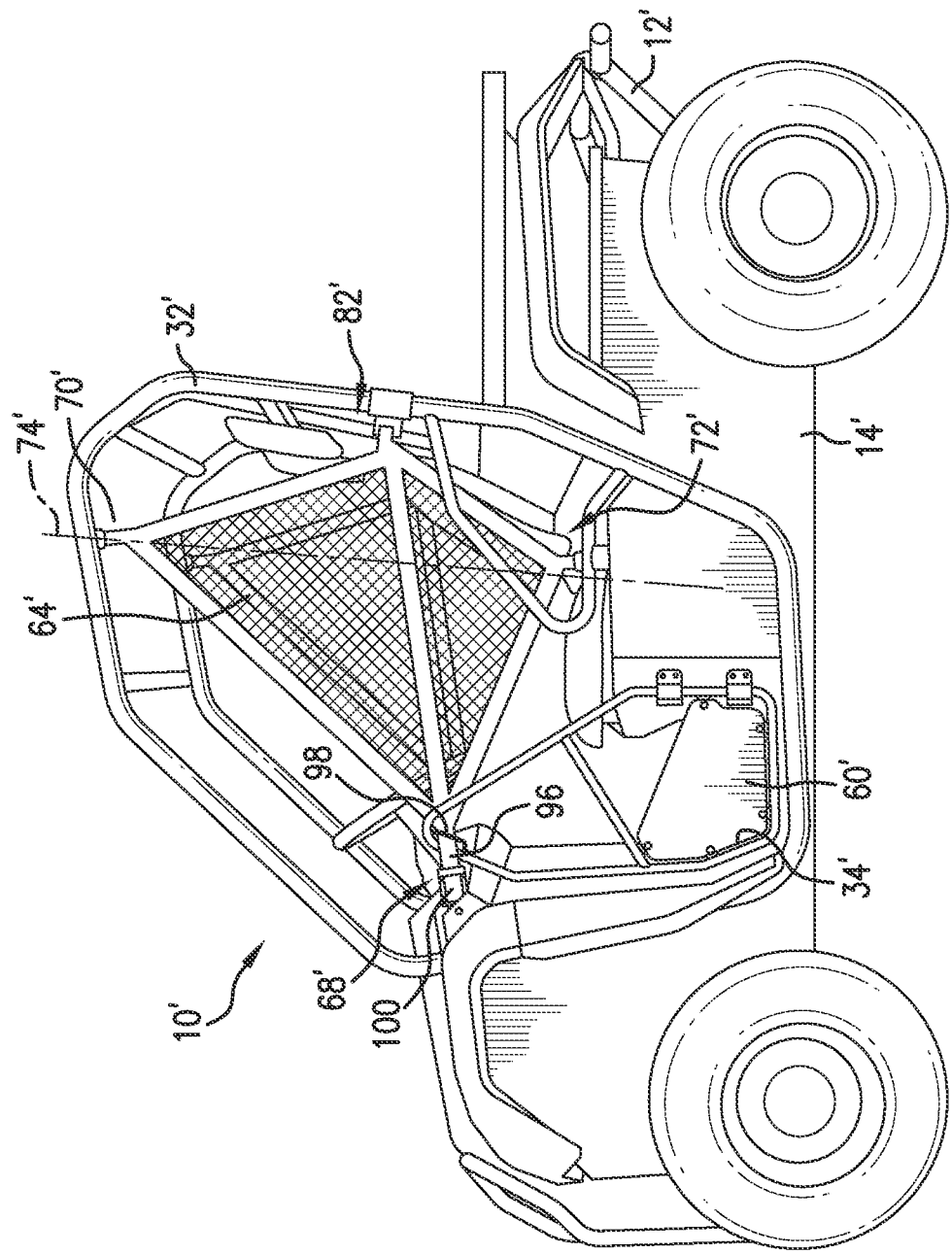
FIG. 6 is a left-side elevation view of a vehicle having a net structure on each side of the vehicle according to an alternate exemplary embodiment.

Advantageously, the net structure 64 (and the net structure 66) provides a safety device that does not inhibit ingress and egress concerning the vehicle 10 and allows for one handed, single operation of the door 60. That is, when the door 60 is opened as shown in FIG. 6, the first connection 68 between the net structure 64 and the door 60 folds a portion of the net structure 64 back to permit ingress and egress with the passenger compartment 30 of the vehicle 10. Meanwhile, tautness along the tautness axis 74 between the second connection 70 and the third connection 72 is maintained, even when the door 60 is opened. This enables the net structure 64 to be used for safe operation of the vehicle 10 while not becoming a hindrance to enjoyment of the vehicle. For example, the occupant OC does not need to perform any complicated and/or time consuming process with respect to the net structure 64 when the occupant desires to enter or exit the vehicle 10. Instead, the net structure 64 remains operational on the vehicle 10 and does not obstruct ingress and egress with the vehicle.

Figure 7:
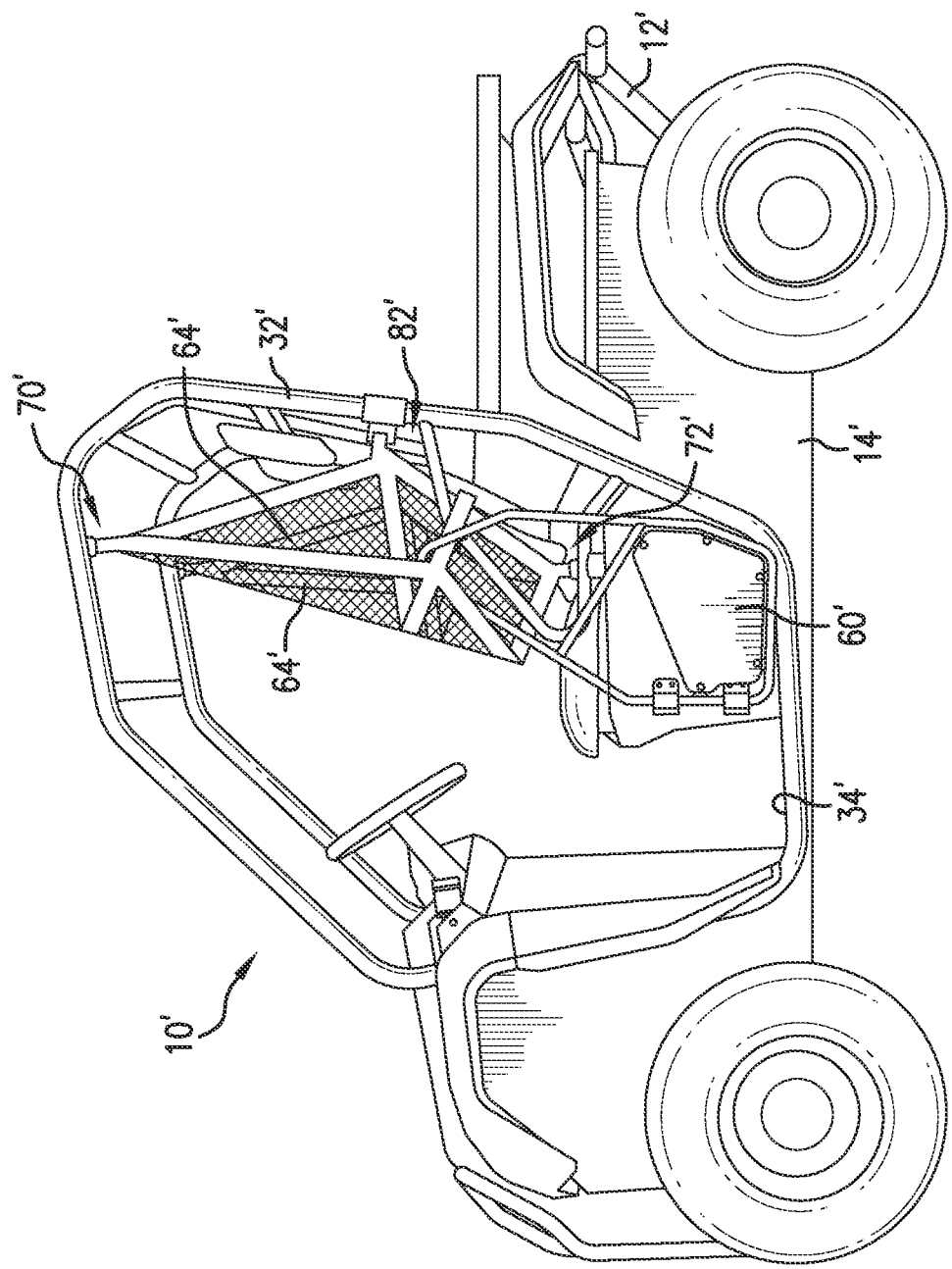
FIG. 7 is a side elevation view similar to FIG. 6, but showing side doors of the vehicle in open positions to fold back respective net structures.

With reference now to FIGS. 6 and 7, a vehicle 10' having a net structure 64' is shown according to an alternate exemplary embodiment. In the alternate embodiment, like or similar elements as compared to the embodiment of FIGS. 1-6 use a shared reference numeral but a prime suffix (') is added the reference numbers in FIGS. 7 and 8. As shown, a first connection 68' for the net structure 64' is provided wherein a tab portion 96 of the net structure 64' passes through an aperture defined by the door, and particularly defined by a raised element 98 fixedly secured to door 60'. Like the vehicle 10, the door 60' of the vehicle 10' is arranged in a side opening 34' of the vehicle 10' for selectively closing at least a portion of the side opening 34'. The tab portion 96 then releasably connects to a releasable fastening element 100 disposed on the vehicle 10' forward of the door 60'. For example, the releasable fastening element 98 can be a buckle-type fastener. This arrangement allows the net structure 64' to be moved relative to the door 60'.

A second connection 70' of the net structure 64' is disposed on a roll cage frame or portion 32' that at least partially defines the side opening 34'. A third connection 72' is disposed on a vehicle frame 12' and/or body 14' to which the door 60' is pivotally mounted. Additionally, a fourth connection 82' is provided between the net structure 64' and the roll cage frame 32'. These connections can be the same or similar to those described hereinabove for the net structure 64 of the embodiment illustrated in FIGS. 1-5C. Like the embodiment of FIGS. 1-6, a tautness axis 74' can be defined along or by the second and third connections 70' and 72' wherealong tautness of the net structure 64' is maintained. Accordingly, a head area defined by the passenger compartment 34' is arranged so that the tautness axis is forward of the head area and tautness of the net structure 64' is maintained forward of the head area.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:
a vehicle frame;
a passenger seating compartment having a head area arranged to be occupied by a occupant's head when seated in the passenger compartment;
a side opening for providing ingress and egress with the passenger seating compartment;
a roll cage frame at least partially defining the side opening;
a door arranged in the side opening for selectively closing a door opening portion of the side opening; and
a net structure having a first connection to the door or to the vehicle frame forward of the door, a second connection to the roll cage frame at or adjacent an upper portion of the passenger seating compartment and a third connection to the roll cage frame, a tautness axis defined between the second connection and the third connection that is forward of the head area, the net structure taut along the tautness axis.

2. The vehicle of claim 1 further including a seat in the passenger seating compartment, the seat having a seat base and a seat back, the head area defined above the seat base and forward of the seat back.

3. The vehicle of claim 1 wherein the door has a forward edge and a rearward edge, the rearward edge pivotally connected to the vehicle frame such that the forward edge is openable to open the door opening portion of the side opening, and wherein the first connection connects the net structure to the door at or adjacent the forward edge of the door.

4. The vehicle of claim 1 wherein the first connection connects the net structure to the vehicle frame forward of the door, the first connection including a tab portion that passes through an aperture defined by the door.

5. The vehicle of claim 1 wherein tautness of the net structure is maintained along the tautness axis when the door is in a closed position and in an open position.

6. The vehicle of claim 1 wherein the door is latchable to the vehicle frame at or adjacent the forward edge of the door.

7. The vehicle of claim 1 wherein the net structure includes a mesh portion and webbing, the webbing disposed at each of the first, second and third connections and interconnected.

8. The vehicle of claim 1 wherein the roll cage frame includes a rear member extending along the passenger compartment from a lower portion of the passenger compartment to an upper portion of the passage compartment and a lower member projecting forwardly from the rear member along a lateral side of the passenger seating compartment, and spaced apart vertically from the lower and upper portions of the passenger compartment and wherein the third connection is to the lower member.

9. A vehicle comprising:
a vehicle frame;
a passenger seating compartment having a head area arranged to be occupied by a occupant's head when seated in the passenger compartment;
a side opening for providing ingress and egress with the passenger seating compartment;
a roll cage frame at least partially defining the side opening;
a door arranged in the side opening for selectively closing a door opening portion of the side opening; and
a net structure having a first connection to the door or to the vehicle frame forward of the door, a second connection to the roll cage frame at or adjacent an upper portion of the passenger seating compartment and a third connection to the roll cage frame, a tautness axis defined between the second connection and the third connection that is forward of the head area, the net structure taut along the tautness axis;
wherein the net structure has a fourth connection to the roll cage frame at a location rearward of the second and third connections.

10. The vehicle of claim 9 wherein the fourth connection is at or adjacent a rear portion of the passenger seating compartment.

11. The vehicle of claim 10 wherein the fourth connection is located at an approximate vertical center of the passenger seating compartment.

12. The vehicle of claim 11 wherein the net structure has a fifth connection to the roll cage frame at a location rearward of the second and third connections and at or adjacent the upper portion of the passenger seating compartment.

13. A net structure for a vehicle, comprising:
a first connection to a door arranged in a side opening of the vehicle for selectively closing a door opening portion of the side opening or to the vehicle forward of the door;
a second connection to a roll cage frame at or adjacent an upper portion of a passenger seating compartment, the roll cage frame at least partially defining the side opening;
a third connection to the roll cage frame at or adjacent a lower portion of the passenger seating compartment; and
a tautness axis defined between the second connection and the third connection that is forward of a head area of the passenger compartment with tautness maintained along the tautness axis.

14. The net structure of claim 13 wherein tautness is maintained along the tautness axis irrespective of a position of the door.

15. The net structure of claim 14 wherein a hinge pivotally connects a rearward edge of the door to the vehicle frame so that a forward edge of the door is openable, the first connection located at or adjacent the forward edge of the door.

16. The net structure of claim 13 further including:
a webbing interconnected to each of the first, second and third connections; and
a mesh arranged within openings defined by the webbing.

17. The net structure of claim 13 further including:
a fourth connection to the roll cage frame at a location rearward of each of the first, second and third connections, the fourth connection at or adjacent a rear portion of the passenger compartment.

18. A door and net structure combination, comprising:
a first connection of the net structure disposed on the door, wherein the door is arranged in a side opening of a vehicle for selectively closing at least a portion of the side opening, the door pivotally connected to the vehicle by a hinged connection;
a second connection of the net structure disposed on a roll cage portion that at least partially defines the side opening at a location vertically above the first connection; and
a third connection of the net structure disposed on the roll cage portion at a location vertically below the first connection,
wherein the second and third connections are both disposed above the hinged connection.

19. The door and net structure combination of claim 18 further including:
a tautness axis defined along the second and third connections wherealong tautness of the net structure is maintained; and
a head area defined by the passenger compartment, the tautness axis arranged forward of the head area so that tautness of the net structure is maintained forward of the head area.

20. The door and net structure combination of claim 19 wherein the door is pivotally mounted to the vehicle frame by a hinge connecting a rear edge of the door.

* * * * *